UNITED STATES PATENT OFFICE.

KARL REINKING AND ARMAND JULIUS STIEGELMANN, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

COMPOUNDS OF LEUCO VAT DYES WITH ARALKYL COMPOUNDS AND PROCESS OF MAKING SAME.

1,106,970.  Specification of Letters Patent. Patented Aug. 11, 1914.

No Drawing.  Application filed September 28, 1910. Serial No. 584,299.

*To all whom it may concern:*

Be it known that we, KARL REINKING and ARMAND JULIUS STIEGELMANN, doctors of philosophy and chemists, subjects, respectively, of the Prince Regent of Brunswick and of the Emperor of Germany, residing at Ludwigshafen-on-the-Rhine, Germany, have invented new and useful Improvements in Compounds of Leuco Vat Dyes with Aralkyl Compounds and Processes of Making Same, of which the following is a specification.

Our invention relates to the production of a new class of compounds and to a process of producing these compounds. We have discovered that the leuco compounds of vat coloring matters, under which term we include indigo, halogen-indigo, and other dyes of the indigo class, and also dyestuffs of the thioindigo class, indanthrene dyes, the vat dyes sold under the name of algol dyes, sulfur dyes, and the like, can combine with aralkyl residues to form a new class of compounds which are characterized by the fact that they are comparatively stable in the air, that is, they are not liable to be oxidized into the corresponding coloring matter, thus differing from the leuco compounds themselves. Under the term "aralkyl residue" we include the mixed residues, such as benzyl, which contain both an aromatic and an aliphatic radicle, the said aliphatic radicle containing a free valency.

The aralkyl compounds which can be used as the source of the aralkyl residues according to this invention possess a residue with a constitution corresponding to the general formula

in which R represents hydrogen, halogen, alkyl, aralkyl, or aryl, and $R_1$ represents aryl, or arlkyl. The alkyl, aryl, or aralkyl groups may be suitably substituted, either with groups which are capable of forming salts or with other substituents. The aralkyl compound must be such that the aralkyl residue is capable of being split off therefrom to combine with the leuco vat coloring matter. As examples of aralkyl compounds which can be employed according to this invention, we mention benzyl-chlorid-para-sulfonic acid and benzyl-chlorid-para-sulfochlorid, benzal chlorid, and as particularly useful the organic ammonium compounds which contain an aralkyl residue, such for instance as dimethyl-phenyl-benzyl-ammonium chlorid and those ammonium compounds which are obtainable by combining benzyl chlorid with dialkyl-meta-aminophenol or with tetra-methyl-diamino-diphenyl-methane, or with leuco malachite green or with the carbinol base of malachite green, or with leuco crystal violent. The sulfonium compounds which are obtainable by combining benzyl haloid with a dialkyl sulfid, such as dimethyl sulfid, are also capable of use according to our invention; or we can employ substituted benzyl haloid, such for instance as para-chlor-benzyl chlorid, omega-chlor-para-xylol, omega-chlor-beta-methyl-naphthalene, and omega-chlor-beta-methyl-anthraquinone, and we can employ these compounds either as such or in a state of combination such that the aralkyl residue is available for combining with the leuco vat coloring matter, for instance the said substituted benzyl haloids may be combined with a tertiary amin, such as di-methyl-anilin, or with a dialkyl sulfid, such as dimethyl sulfid. In some cases it may be advisable to employ a mixture of a benzyl haloid admixed with a tertiary amin or the like without its being necessary previously to combine the tertiary amin with the benzyl haloid. Aralkyl compounds which do not give up an aralkyl residue to enable it to combine with a leuco compound of a vat coloring matter, for instance benzyl-anilin-sulfonic acid and dibenzyl oxid, are not capable of use according to our invention. As aforesaid, our new compounds are comparatively stable in the presence of air and consequently, when a vat coloring matter is treated on the fiber with a reducing agent in the presence of an aralkyl compound as aforesaid, one of our new stable compounds, containing the leuco vat coloring matter and the aralkyl residue, is formed and remains as such on the fiber. Since this compound is stable in the air, the material does not need to be treated with such care as in those cases where no aralkyl compound is present, because when material dyed with vat coloring matters is discharged with a formaldehyde sulfoxylate, or the like, without the addition of an aralkyl compound, the discharged portions on the fiber, when the goods are taken out of the steaming apparatus, are very sensitive and unless very good apparatus be employed and very great care be taken, pure discharge effects are not obtained. When, however, an aralkyl compound of the type described is added to the discharging paste, discharge effects can be obtained which are not sensitive to the air and consequently remain pure. Our invention is therefore of great benefit to the trade because it enables large quantities of material to be treated with the discharging paste and then steamed without its being necessary immediately to remove, by washing or otherwise, the resulting products of the reduction of vat coloring matter.

As a rule, when the aralkyl residue contains a group capable of forming a salt, such for instance as a sulfonic acid group or a carboxylic acid group or a hydroxyl group, the compounds which it forms with the leuco coloring matter are easily soluble in an alkaline bath, and consequently they can be readily washed away from the fiber and white discharge effects can thus be produced on fiber which has been dyed with the vat coloring matter. On the other hand, when the aralkyl compound employed contains no such group capable of forming a salt attached directly to the aralkyl residue, the compounds formed containing the aralkyl residue and the leuco compound of the coloring matter are sometimes insoluble in acid or alkali and remain fixed on the fiber. Thus, for instance, if thioindigo be discharged, a slightly colored compound is formed which can easily be washed away leaving pure white effects. On the other hand, if material dyed with indigo be discharged while employing an aralkyl compound, such as dimethyl-phenyl-benzyl-ammonium chlorid, a compound of an intensely yellow color is formed, and, as this is stable in the air and also fairly stable against the action of solvents, yellow discharge effects can thus be obtained. These yellow effects can be shaded off and at the same time be made more stable by adding to the discharging paste a metallic compound, such as an oxid, or hydroxid, or a salt. For instance, if zinc oxid be added, a brilliant orange is obtained capable of withstanding the action of boiling alkali, whereas if magnesia be used, a sulfur yellow is produced, while alumina gives rise to a cream color, and iron oxid to a brownish olive color. The homologues and substitution products of indigo behave in a similar manner. The indigoid coloring matter obtainable from dibrom-isatin chlorid and alphaanthrol gives rise to a red compound. If an aralkyl residue containing a sulfonic acid group, such for instance as a sulfonic acid derivative of dimenthyl-phenyl-benzyl-ammonium chlorid containing the sulfonic acid group in the benzyl residue, be added to the discharging paste, pure white effects can be produced on material which has been dyed with indigo. In this case yellowish compounds are at first produced, but they can be entirely removed from the fiber by treatment with a hot alkaline bath such as is generally employed after sodium formaldehyde sulfoxylate has been used for discharging vat coloring matters. Owing to the extreme solubility in alkali of the yellowish intermediate products produced when discharging indigo dyeings with the aid of a sulfonic acid of an organic ammonium compound, the discharging process as a whole is simplified, because the goods do not require to be treated for so long a time in the hot alkaline bath and this bath can contain less alkali and can also be employed at a lower temperature. In this case also, the addition of a metallic oxid is advantageous, zinc oxid being particularly useful for this purpose.

In carrying out the process of this invention, the vat coloring matter can be reduced to its leuco compound by means of any suitable reagent; for instance, formalydehyde sulfoxylate, formaldehyde hydrosulfite, and hydrosulfite, are very suitable for the purpose, but other reducing, or discharging, agent, can be employed, such for instance as a suitable carbohydrate, or stannous oxid, and in some cases even the reducing action exercised by the usual thickening agents in the presence of caustic alkali is sufficient to produce the result desired. The same compounds are produced whether the combination of the aralkyl residue with the leuco coloring matter takes place in the presence of the fiber or otherwise.

During the discharge, other coloring matters may be present for the purpose of producing various colored discharge effects and of course when preparing the discharge pastes according to this invention, other suitable ingredients, such for instance as alkalis, oil of turpentine and glycerin, which enhances the printing properties of the paste, or a catalytic agent which assists in the reduction, such, for instance, as anthraquinone, can be added.

As aforesaid, those compounds in which the aralkyl residue contains no group capable of forming a salt, such as a sulfonic acid group or a carboxylic acid group of a hydroxyl group, tend generally to yield insoluble compounds with the leuco vat coloring matters, in particular with indigo white, while those in which the aralkyl residue contains such a group capable of forming a salt, tend to yield soluble compounds with the leuco vat coloring matter. Thus for instance the dimethyl-phenyl-benzyl-ammonium chlorid sulfonic acid in which the sulfonic acid is in the benzyl group gives a soluble yellow compound with indigo white, while the dimethyl-phenyl-benzyl-ammonium chlorid sulfonic acid, obtainable by combining dimethyl-anilin-sulfonic acid with benzyl chlorid yields an insoluble yellow compound with indigo white. New sulfonic acids and carboxylic acids of organic ammonium compounds containing at least one aralkyl group suitable for use according to this invention are described in the application for Letters Patent Serial No. 584,131, which describes the production of organic ammonium compounds such, for instance, as the anhydrid of dimethyl-phenyl-benzyl-ammonium hydroxid disulfonic acid, either by direct sulfonation, or by combining dimethyl-anilin, or the like, with benzyl-chlorid-sulfonic acid or benzyl-chlorid-carboxylic acid.

The group capable of forming a salt, such as the sulfonic acid group or the carboxylic acid group of the hydroxyl group, may either be present as such, or anhydrid formation may have taken place between the group capable of forming a salt and another part of the compound, such for instance, as occurs when the elements of hydrochloric acid split off from dimethyl-phenyl-benzyl-ammonium chlorid-disulfonic acid. Under the term "group capable of forming a salt" we include also such groups as —SO₂Cl, which contain no hydrogen, and further the compound of the formula

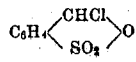

which is formed by a lactone condensation from benzalchlorid-ortho-sulfonic acid, can be employed according to our invention.

The following examples will serve to illustrate further the nature of our invention and how it can be carried into practical effect, but the invention is not confined to these examples. The parts are by weight.

*Example 1—Discharging paste.*—Mix well one hundred and fifty parts of sodium formaldehyde sulfoxylate, or hydrosulfite in powder, in one hundred and fifty parts of water, with seventy parts of dimethyl-phenyl-benzyl-ammonium chlorid in one hundred parts of water, and add five hundred and thirty parts of fifty per cent. gum thickening.

*Example 2—Discharging paste with zinc oxid.*—Stir together one hundred parts of zinc oxide and one hundred parts of water, add seventy parts of dimethyl-phenyl-benzyl-ammonium chlorid in one hundred parts of water, one hundred and fifty parts of sodium formaldehyde sulfoxylate, or hydrosulfite, one hundred parts of sodium sulfite, forty parts of a thirty per cent. paste of anthraquinone, and three hundred and forty parts of a fifty per cent. gum thickening. In this example, the zinc oxid can be replaced by the corresponding quantity of other suitable metallic oxid, hydroxid, or salt.

After the material has been printed with a paste such as those described in the foregoing examples, it is steamed for about five minutes in the continuous steamer, then treated with warm water to which some caustic soda may have been added, then washed, and finally soaped.

When either of the pastes described in the foregoing examples is employed as described on material dyed with indigo, a new yellow insoluble compound containing a leuco compound of indigo and the benzyl residue is produced, and thus yellow discharge effects are obtained which are stable against the action of washing and soap. These yellow discharge effects are also stable against the action of an alkaline solution of potassium ferricyanid, thus differing from indigo, and consequently if material obtained according to this example and containing a yellow discharge effect on a blue ground be treated with an alkaline solution of potassium ferricyanid, the indigo is removed and a yellow pattern on a white ground is obtained.

*Example 3.*—Mix well together a paste of fifty parts of zinc white, fifty parts of water, and fifty parts of glycerin, fifty parts of a thirty per cent. anthraquinone paste, fifty parts of dimethyl-phenyl-benzyl-ammonium chlorid in fifty parts of water, fifty parts of sodium formaldehyde sulfoxylate, five hundred and fifty parts of fifty per cent. British gum thickening, and fifty parts of dehydro-indigo bisulfite in fifty parts of water.

Print the paste on to white material, or on to material which has been dyed with a dischargeable coloring matter, such as an azo dye, dry steam for from three to five minutes, and then wash. The brilliancy of the yellow discharge effect thus obtained can be increased by subsequently passing the material through hot dilute alkali and then through an acid bath. In the foregoing example 3, the quantities can be varied to suit any particular case.

*Example 4.*—Prepare a paste from seventy parts of zinc oxide, seventy parts of water, eighty parts of a thirty per cent. paste of anthraquinone, a solution of one hundred parts of benzyl-chlorid-para-sulfochlorid in one hundred parts of water, and one hundred parts of ammonium carbonate, and one hundred and twenty parts of sodium formaldehyde sulfoxylate dissolved in three hundred and sixty parts of a fifty per cent. gum thickening. Print this paste on to the material which has been dyed with indigo, dry, steam for five minutes in steam which is free from air, and pass the material through a boiling bath containing five parts of thirty-five per cent. caustic soda solution per thousand parts of water, and finally wash the material. During the process of steaming the indigo is reduced to a leuco compound thereof which combines with sulfonated benzyl residue to form a stable yellow compound which is soluble in alkali. A white discharge effect is therefor obtained. A similar result is obtained if the benzyl-chlorid-para-sulfochlorid in the above example 4 be replaced by benzyl-chlorid-para-carboxylic acid or by the sodium salt of benzylchlorid-para-sulfonic acid.

*Example 5.*—Mix together one hundred parts of zinc oxid, made into a paste with one hundred parts of water, a solution of seventy parts of the ammonium base produced from benzyl chlorid and dimethyl-anilin-meta-sulfonic acid, in one hundred parts of water, add one hundred and fifty parts of sodium formaldehyde sulfoxylate or hydrosulfite, one hundred parts of sodium sulfite, forty parts of a thirty per cent. paste of anthraquinone, and three hundred and forty parts of a fifty per cent. gum thickening. This paste produces yellow discharge effects on material which has been dyed with indigo.

*Example 6.*—In order to produce discharge effects on material which has been dyed with sulfur coloring matter, pad such dyed material with a solution of one hundred and fifty parts of the inner anhydrid of dimethyl-phenyl benzyl-ammonium hydroxid disulfonic acid (obtainable by disulfonating dimethyl-phenyl-benzyl-ammonium chlorid and containing at least one sulfonic acid group in the benzyl residue) in fifty parts of sodium carbonate and eight hundred parts of water. Then print on to the material thus padded a paste prepared from seventy parts of zinc oxid, seventy parts of glycerin, forty parts of a thirty per cent. paste of anthraquinone, one hundred parts of sodium formaldehyde sulfoxylate, one hundred and fifteen parts of the inner anhydrid of dimethyl-phenyl-benzyl-ammonium hydroxid disulfonic acid, one hundred and fifty parts of water, and four hundred and fifty-five parts of an alkaline thickening (containing per one thousand parts four hundred parts of dextrin and six hundred parts of thirty-five per cent. caustic soda solution). Steam the material for five minutes in the continuous steamer and pass through a bath containing ten cubic centimeters of waterglass per liter. During the steaming, the coloring matter is reduced to a leuco compound thereof which combines with the sulfonated benzyl residue to form a soluble staple compound, which by the after-treatment is washed away leaving a white discharge effect.

*Example 7.*—Prepare a paste from seventy parts of zinc oxid in seventy parts of water, seventy parts of the disulfonic acid prepared by sulfonating the ammonium base obtainable from dimethyl-anilin and benzyl chlorid, one hundred parts of water, one hundred and fifty parts of sodium formaldehyde sulfoxylate, one hundred parts of sodium sulfite, forty parts of a thirty per cent. paste of anthraquinone, and four hundred parts of fifty per cent. gum thickening. Print this paste on to the material which has been dyed with indigo, steam for five minutes in a continuous steamer, pass it through a bath containing dilute caustic soda, during which process the soluble compound of leuco indigo with the sulfonated benzyl residue is dissolved away from the material and consequently a white discharge effect is produced. Finally wash and, if desired, soap the material. In this example the disulfonic acid mentioned may be replaced, for instance, by the compound obtained by treating with a sulfonating agent the condensation product of benzyl chlorid with dimethyl-metanilic acid, or with dimethyl-amino-benzoic acid.

*Example 8.*—Prepare a paste from one hundred parts of zinc oxid, one hundred parts of glycerin, eighty parts of the sodium salt of benzal-chlorid-meta-sulfonic acid (obtainable by treating benzal-dehyde-meta-sulfonic acid with phosphorus pentachlorid and then saponifying the benzal-chlorid-meta-sulfochlorid thus obtained), one hundred parts of water, one hundred and fifty parts of sodium formaldehyde sulfoxylate or hydrosulfite, forty parts of a thirty per cent. paste or anthraquinone, and four hundred and thirty parts of a fifty per cent. gum thickening. Print this paste on to the material which has been dyed with indigo, steam for five minutes in steam which is free from air, and then pass the material through a boiling bath containing five cubic centimeters of thirty-five per cent. caustic soda in each liter, and finally wash. The compound formed from the leuco indigo body and the benzyl derivative is soluble in dilute caustic soda, and consequently white discharge effects are obtained.

*Example 9.*—Prepare a paste from one hundred parts of zinc white, one hundred parts of water, seventy parts of dimethyl-benzyl-sulfinium-methyl-sulfate (obtainable by treating methyl-benzyl-sulfid with dimethyl sulfate) in one hundred parts of water, one hundred and fifty parts of sodium formaldehyde sulfoxylate or of hydrosulfite, one hundred parts of sodium sulfite, forty parts of a thirty per cent. paste of anthraquinone, and three hundred and forty parts of a fifty per cent. gum thickening. Print this paste on to material which has been dyed with indigo, steam for five minutes in a continuous steamer, wash with dilute caustic soda, and, if necessary, soap. In this way yellow discharge effects are obtained.

In this example 9, the sulfinium compound mentioned can be replaced by other suitable sulfininium compound, such for instance as dimethyl-benzyl-sulfininium chlorid (obtainable from dimethyl-sulfid and benzyl-chlorid), which yields yellow effects on material dyed with indigo; or dimethyl-benzyl-sulfinium-para-sulfonic acid which yields soluble compounds with leuco indigo and can therefore be employed for the production of white discharge effects.

*Example 10.*—Prepare a paste from seventy parts of zinc oxid, seventy parts of water, sixty parts of a thirty per cent. paste of anthraquinone, eighty parts of the ammonium salt obtainable from benzyl-chlorid-para-carboxylic acid and dimethyl-anilin, one hundred parts of water, one hundred and twenty parts of sodium formaldehyde sulfoxylate, twenty-four parts of calcined soda, and four hundred and seventy-six parts of fifty per cent. gum thickening. Print this paste on to material which has been dyed with indigo, treat with steam which is free from air, and then pass through a weakly alkaline bath. In this way white discharge effects are obtained. In this example 10, the ammonium salt aforesaid can be replaced by the di-ammonium salt obtainable from meta-hydroxy-benzyl-bromid carbonate (produced by brominating cresyl carbonate at from one hundred and thirty to one hundred and sixty degrees centigrade) and dimethyl-anilin.

*Example 11.*—Prepare a paste from seventy parts of zinc oxid, seventy parts of glycerin, eighty parts of omega-brom-beta-methyl-anthraquinone, eighty parts of sodium dimethyl-metanilate, one hundred parts of water, sixty parts of a thirty per cent. paste of anthraquinone, one hundred and twenty parts of sodium formaldehyde sulfoxylate and four hundred and twenty parts of fifty per cent. gum thickening. Print this paste on to material which has been dyed with indigo, steam in apparatus which is free from air, and then pass the material through a weakly alkaline bath, whereupon white discharge effects are obtained.

*Example 12.*—Prepare a paste from seventy parts of zinc oxid, seventy parts of glycerin, forty parts of a thirty per cent. paste of anthraquinone, fifty parts of sodium dimethyl-metanilate, thirty parts of benzyl chlorid, one hundred and twenty parts of water, one hundred and forty parts of sodium formaldehyde sulfoxylate, and four hundred and eighty parts of fifty per cent. gum thickening. Allow this paste to stand for a few hours and then print it on to material which has been dyed with indigo, treat the material with steam which is free from air, and then wash it in a weakly alkaline bath. In this case the compound which is produced from the leuco indigo and the benzyl residue is yellow and insoluble in alkali; consequently yellow discharge effects are produced.

In order to prepare one of our new compounds in the free state, stir together, in a vessel provided with a reflux apparatus, fifty parts of indigo pure BASF., seventy-five parts of sodium formaldehyde sulfoxylate, seventy parts of zinc oxid, sixty-two parts of dimethyl-phenyl-benzyl-ammonium chlorid, and one hundred and thirty parts of water, and gradually raise the temperature until the mass boils, and maintain this temperature for about four hours. Then allow to cool and, at a temperature of about seventy degrees centigrade, add two hundred and forty parts of alcohol. Stir till the mixture is homogeneous, filter off the product and wash it with alcohol, and then extract it with hot dilute alkaline hydrosulfite solution until any unchanged indigo is removed. Then boil with dilute acetic acid, filter, wash and dry the product obtained. It consists of an orange colored powder which is insoluble in boiling dilute caustic soda solution, but which yields a blue-green solution in concentrated sulfuric acid, and on boiling with nitrobenzene gives a green solution, from which, on cooling, indigo separates out.

Now what we claim is:—

1. The process of producing new compounds by combining an aralkyl residue with a leuco compound of a vat coloring matter.

2. The process of producing a new compound by combining an aralkyl residue with a leuco compound of a vat coloring matter in the presence of fibrous material.

3. The process of producing new compounds on fiber by applying to the fiber a vat coloring matter and a suitable aralkyl compound and causing the vat coloring matter to be reduced to its leuco compound and to combine with the aralkyl compound substantially as hereinbefore described.

4. The process of producing a new compound by combining a benzyl residue with a leuco compound of a vat coloring matter.

5. The process of producing a new compound by combining an aralkyl residue with a leuco compound of an indigo coloring matter.

6. The process of producing a new compound by combining an aralkyl residue with a leuco compound of an indigo coloring matter in the presence of fibrous material.

7. The process of producing new compounds on fiber by applying to the fiber an indigo coloring matter and a suitable aralkyl compound and causing the indigo coloring matter to be reduced to its leuco compound and to combine with the aralkyl compound substantially as hereinbefore described.

8. The process of producing new compounds soluble in dilute alkali by combining an aralkyl residue containing a group capable of forming a salt with a leuco compound of an indigo coloring matter.

9. The process of producing new compounds on fiber by applying to the said fiber an indigo coloring matter and an aralkyl compound in which the aralkyl residue contains a group capable of forming a salt, and then treating the fiber with a reducing agent, substantially as hereinbefore described.

10. The process of producing new compounds by treating fiber, which has been dyed with an indigo coloring matter, with a reducing agent and with an aralkyl compound in which the aralkyl residue contains a group capable of forming a salt, thus causing the leuco coloring matter to be produced and to combine with the aralkyl residue substantially as hereinbefore described.

11. The process of producing new compounds from fiber which has been dyed with an indigo coloring matter, by causing the indigo coloring matter to be reduced to its leuco compound and to combine with a sulfonated benzyl residue.

12. The process of producing new compounds by applying to fiber which has been dyed with indigo coloring matter, a paste containing formaldehyde sulfoxylate and an inner anhydrid of a dimethyl-phenyl-benzyl-ammonium-hydroxid sulfonic acid in which the benzyl residue contains at least one sulfonic acid residue, then steaming the material and thereby causing the indigo coloring matter to be reduced and to combine with the sulfonated benzyl residue.

13. The process of producing new compounds by applying to fiber which has been dyed with indigo coloring amtter, a paste containing formaldehyde sulfoxylate and the inner anhydrid of dimethyl-phenyl-benzyl-ammonium-hydroxid disulfonic acid, obtainable by sulfonating dimethyl-phenyl-benzyl-ammonium chlorid, then steaming the material and thereby causing the indigo coloring matter to be reduced and to combine with the sulfonated benzyl residue.

14. As new articles of manufacture compounds containing an aralkyl residue combined with a leuco compound of a vat coloring matter, which compounds are stable in the presence of alkali and of air, not being converted into the corresponding vat coloring matters by such treatment.

15. As new articles of manufacture compounds containing an aralkyl residue combined with a leuco compound of an indigo coloring matter, which new compounds possess yellow to red to brown shades and are stable in the presence of alkali and of air and which are soluble in dilute alkali when the aralkyl residue contains a group capable of forming a salt but are otherwise insoluble.

16. As new articles of manufacture compounds containing a benzyl residue combined with a leuco compound of an indigo coloring matter, which new compounds possess yellow to red to brown shades, are stable in the presence of alkali and of air and are soluble in dilute alkali when the benzyl residue contains a group capable of forming a salt, but are otherwise insoluble.

17. As new articles of manufacture compounds containing a sulfonated benzyl residue combined with a leuco compound of an indigo coloring matter, which new compounds possess yellow to red to brown shades, are stable in the presence of alkali and of air, and are soluble in dilute alkali.

18. As new articles of manufacture compounds containing a benzyl residue combined with a leuco compound of an indigo coloring matter and a metallic compound, which new compounds possess yellow to red to brown shades, are stable in the presence of alkali and of air and are soluble in dilute alkali when the benzyl residue contains a group capable of forming a salt, but are otherwise insoluble.

19. As new articles of manufacture compounds containing a sulfonated benzyl residue combined with a leuco compound of an indigo coloring matter and a metallic compound, which new compounds possess yellow to red to brown shades, are stable in the presence of alkali and of air, and are soluble in dilute alkali.

20. As new articles of manufacture compounds containing a sulfonated benzyl residue combined with indigo white and zinc oxid, which new compounds possess an orange color, are stable in the presence of alkali and air, and are soluble in dilute alkali.

In testimony whereof we have hereunto set our hands in the presence of two subscribing witnesses.

KARL REINKING.
    ARMAND JULIUS STIEGELMANN.

Witnesses:
    J. ALEX. LLOYD,
    JOSEF TSCIFFER.